(12) United States Patent
Holecek et al.

(10) Patent No.: US 7,747,965 B2
(45) Date of Patent: Jun. 29, 2010

(54) SYSTEM AND METHOD FOR CONTROLLING THE OPACITY OF MULTIPLE WINDOWS WHILE BROWSING

(75) Inventors: Ales Holecek, Bellevue, WA (US); Charles W. Stabb, Seattle, WA (US); Donald J. Lindsay, Mountain View, CA (US); Hillel N. Cooperman, Sammamish, WA (US); Mark R. Ligameri, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 11/036,612

(22) Filed: Jan. 18, 2005

(65) Prior Publication Data

US 2006/0294475 A1    Dec. 28, 2006

(51) Int. Cl.
*G06F 3/00* (2006.01)
*G06F 17/00* (2006.01)

(52) U.S. Cl. .............. 715/781; 715/768; 715/766; 715/767; 715/790; 715/794

(58) Field of Classification Search ............ 715/781, 715/768, 766, 767, 790, 794
See application file for complete search history.

(56) References Cited

U.S. PATENT DOCUMENTS

| | | |
|---|---|---|
| 4,651,146 A | 3/1987 | Lucash |
| 4,653,020 A | 3/1987 | Cheselka |
| 4,862,389 A | 8/1989 | Takagi |
| 5,412,776 A | 5/1995 | Bloomfield et al. |
| 5,463,726 A | 10/1995 | Price |
| 5,499,334 A | 3/1996 | Staab |
| 5,515,494 A | 5/1996 | Lentz |
| 5,546,528 A | 8/1996 | Johnston |
| 5,651,107 A * | 7/1997 | Frank et al. ............ 715/768 |
| 5,668,962 A | 9/1997 | Kitami |
| 5,754,809 A | 5/1998 | Gandre |
| 5,758,110 A | 5/1998 | Boss |
| 5,841,435 A | 11/1998 | Dauerer |
| 5,874,960 A | 2/1999 | Mairs |
| 5,880,733 A | 3/1999 | Horvitz |
| 5,889,517 A | 3/1999 | Ueda |
| 5,892,511 A | 4/1999 | Gelsinger |
| 5,898,433 A | 4/1999 | Hijikata |
| 5,920,316 A | 7/1999 | Oran |
| 5,949,432 A * | 9/1999 | Gough et al. ............ 345/629 |

(Continued)

OTHER PUBLICATIONS

Microsoft Windows XP 2002, Microsoft Corp. Professional version 2002, screen shots 1-5.*

(Continued)

*Primary Examiner*—William L Bashore
*Assistant Examiner*—Daeho D Song
(74) *Attorney, Agent, or Firm*—Shook, Hardy & Bacon L.L.P.

(57) ABSTRACT

A method referred to as x-ray browsing for allowing a user to browse through windows on their desktop is provided. Aspects of the invention include responsive to a command, making a first window the window in focus on the display screen and changing the relative opacities between a content portion of the first window and a content portion of the second window. By controlling the opacities a single window can be made opaque while the remaining windows can be made transparent to allow a user to successively navigate among open windows.

12 Claims, 11 Drawing Sheets

U.S. PATENT DOCUMENTS

| | | |
|---|---|---|
| 6,008,809 A | 12/1999 | Brooks |
| 6,031,530 A | 2/2000 | Trueblood |
| 6,040,833 A | 3/2000 | Henshaw |
| 6,072,488 A | 6/2000 | McFarland |
| 6,075,531 A | 6/2000 | DeStefano |
| 6,108,714 A | 8/2000 | Kumagai |
| 6,160,554 A | 12/2000 | Krause |
| 6,166,736 A | 12/2000 | Hugh |
| 6,184,883 B1 | 2/2001 | Bates |
| 6,215,490 B1 | 4/2001 | Kaply |
| 6,229,542 B1 | 5/2001 | Miller |
| 6,239,798 B1 | 5/2001 | Ludolph |
| 6,272,484 B1 | 8/2001 | Martin |
| 6,275,227 B1 | 8/2001 | DeStefano |
| 6,313,855 B1 | 11/2001 | Shuping |
| 6,321,209 B1 | 11/2001 | Pasquali |
| 6,344,863 B1 | 2/2002 | Capelli et al. |
| 6,411,292 B1 | 6/2002 | Cook et al. |
| 6,429,855 B2 | 8/2002 | Pabon |
| 6,429,883 B1 | 8/2002 | Plow et al. |
| 6,486,895 B1 | 11/2002 | Robertson et al. |
| 6,549,218 B1* | 4/2003 | Gershony et al. ............ 715/781 |
| 6,577,330 B1 | 6/2003 | Tsuda |
| 6,590,593 B1 | 7/2003 | Robertson et al. |
| 6,590,594 B2 | 7/2003 | Bates |
| 6,597,358 B2 | 7/2003 | Miller |
| 6,628,310 B1 | 9/2003 | Hiura et al. |
| 6,636,246 B1 | 10/2003 | Gallo et al. |
| 6,686,938 B1 | 2/2004 | Jobs |
| 6,710,788 B1 | 3/2004 | Freach et al. |
| 6,720,982 B1 | 4/2004 | Sakaguchi |
| 6,734,873 B1* | 5/2004 | Herf et al. ................... 345/629 |
| 6,781,611 B1 | 8/2004 | Richard |
| 6,822,662 B1 | 11/2004 | Cook et al. |
| 6,874,123 B1 | 3/2005 | DeStefano |
| 6,915,489 B2 | 7/2005 | Gargi |
| 6,922,815 B2 | 7/2005 | Rosen |
| 6,957,395 B1 | 10/2005 | Jobs |
| 6,988,135 B2 | 1/2006 | Martin et al. |
| 6,996,783 B2* | 2/2006 | Brown et al. ................. 715/790 |
| 7,028,264 B2 | 4/2006 | Santoro |
| 7,047,500 B2 | 5/2006 | Roelofs |
| 7,103,850 B1 | 9/2006 | Engstrom et al. |
| 7,119,819 B1 | 10/2006 | Robertson |
| 7,146,573 B2* | 12/2006 | Brown et al. ................. 715/802 |
| 7,159,189 B2 | 1/2007 | Weingart et al. |
| RE39,610 E | 5/2007 | McFarland |
| 7,250,955 B1* | 7/2007 | Beeman et al. ............. 345/592 |
| 7,296,242 B2 | 11/2007 | Agata et al. |
| 7,386,801 B1 | 6/2008 | Horvitz et al. |
| 7,439,975 B2 | 10/2008 | Hsu |
| 7,506,267 B2 | 3/2009 | Baxter et al. |
| 2001/0028368 A1 | 10/2001 | Swartz et al. |
| 2001/0035882 A1 | 11/2001 | Stoakley |
| 2002/0091739 A1 | 7/2002 | Ferlitsch et al. |
| 2002/0130904 A1 | 9/2002 | Becker |
| 2002/0171682 A1* | 11/2002 | Frank et al. ................. 345/790 |
| 2003/0117440 A1 | 6/2003 | Hellyar et al. |
| 2003/0142108 A1* | 7/2003 | Brown et al. ................. 345/589 |
| 2003/0142109 A1* | 7/2003 | Brown et al. ................. 345/592 |
| 2003/0142136 A1 | 7/2003 | Carter et al. |
| 2003/0142138 A1* | 7/2003 | Brown et al. ................. 345/797 |
| 2003/0142140 A1* | 7/2003 | Brown et al. ................. 345/803 |
| 2003/0164862 A1 | 9/2003 | Cadiz et al. |
| 2003/0179237 A1 | 9/2003 | Nelson |
| 2003/0210270 A1 | 11/2003 | Clow |
| 2004/0066408 A1 | 4/2004 | Meyers |
| 2004/0174396 A1 | 9/2004 | Jobs |
| 2004/0212640 A1 | 10/2004 | Mann |
| 2004/0255254 A1 | 12/2004 | Weingart |
| 2004/0261037 A1* | 12/2004 | Ording et al. ................ 715/788 |
| 2004/0261038 A1* | 12/2004 | Ording et al. ................ 715/792 |
| 2004/0261039 A1 | 12/2004 | Pagan |
| 2005/0022139 A1 | 1/2005 | Gettman et al. |
| 2005/0091597 A1 | 4/2005 | Ackley |
| 2005/0125742 A1 | 6/2005 | Grotjohn et al. |
| 2005/0132299 A1 | 6/2005 | Jones |
| 2005/0188326 A1 | 8/2005 | Ikeda |
| 2005/0204306 A1 | 9/2005 | Kawahara et al. |
| 2005/0210388 A1 | 9/2005 | Matsumoto |
| 2005/0210410 A1 | 9/2005 | Ohwa |
| 2005/0223334 A1 | 10/2005 | Guido |
| 2005/0235209 A1 | 10/2005 | Morita |
| 2005/0289482 A1 | 12/2005 | Anthony et al. |
| 2006/0041846 A1 | 2/2006 | Masselle |
| 2006/0107229 A1 | 5/2006 | Matthews et al. |
| 2006/0123353 A1 | 6/2006 | Matthews |

OTHER PUBLICATIONS

"Exposé—Find the window you need. Now." Apple-Mac OS X—Features—Exposé, Nov. 2, 2004, 2 pages, http://www.apple.com/macosx/features/expose/.

"Project Looking Glass" Sun Microsystems, Nov. 8, 2004, 9 pages, http://wwws.sun.com/software/looking_glass/.

"Mozilla," printed from Internet on Nov. 4, 2004, http://www.mozila.org/products/firefox/tabbed-browsing.html, 3 pages.

"Opera Software," printed from Internet on Nov. 4, 2004, http://www.opera.com/features/index.dml, 8 pages.

"Safari, The fastest browser on the Mac—the best browser on any platform.", printed from Internet on Nov. 4, 2004, http://www.apple.com/safari/ , 3 pages.

Shneiderman, Ben, "Treemaps for space-constrained visualization of hierarchies," Dec. 26, 1998, (updated May 18, 2004), 10 pages, printed from the internet on Nov. 2, 2004, http://www.cs.umd.edu/hcil/treemap-history/.

IronBytes, AltSwitch, Oct. 2004, (Webarchive:http://web.archive.org/web/20041014013718/www.ironbytes.com/index.html).

Shareup, AltSwitchReview, Sep. 2004 (http://www.shareup.com/AltSwitch-download-21278.html X.

SoftSea, AltSwitchReview, Oct. 2004 (http://www.softsea.com/review/AltSwitch.html).

WinGlance, Jul. 2004, http://winglance.usablelabs-com.qarchive.org/.

Microsoft, "Microsoft PowerToys for Windows XP," Sep. 25, 2008, Windows XP Home, 2 pages.

T-J Fan, "Left-Shift and Right-Shift Buttons for a Standard Window," Jun. 1993, 4 pages, vol. 36, Publication No. 6A, Order/Fcode/Docket: 93A 51293 / / Y08920728, IBM Technical Disclosure Bulletin.

Microsoft Research, "The TaskGallery," Jul. 28, 2005, 3 pages, web contact dcr@microsoft.com.

Advisory Action mailed Jun. 9, 2008 re U.S. Appl. No. 11/036,614.

Advisory Action mailed Jul. 1, 2008 re U.S. Appl. No. 11/036,611.

"Exposé—Find the window you need. Now." Apple-Mac OS X—Features—Exposé, Nov. 2, 2004, 2 pages, http://www.apple.com/macosx/features/expose/ .

Final Office Action mailed Feb. 7, 2007 re U.S. Appl. No. 11/036,610.

Final Office Action mailed Feb. 26, 2008 re U.S. Appl. No. 11/036,614.

Final Office Action mailed Mar. 13, 2008 re U.S. Appl. No. 11/036,611.

Final Office Action mailed Jun. 13, 2008 re U.S. Appl. No. 11/036,610.

Final Office Action mailed Aug. 19, 2008 re U.S. Appl. No. 11/036,215.

Final Office Action mailed Dec. 7, 2009 re U.S. Appl. No. 11/036,611.

IronBytes, AltSwitch, Oct.2004, (Webarchive:http://web.archive.org/web/20041014013718/www.ironbytes.com/index. html).

Removed—Previously Cited Reference.

"Mozilla," printed from Internet on Nov. 4, 2004, http://www.mozila.org/products/firefox/tabbed-browsing.html, 3 pages.

"Mozilla," printed from Internet on Aug. 12, 2009, http://www.mozila.org/products/firefox/tabbed-browsing.html, 3 pages.

Non-final Office Action mailed Aug. 24, 2006 re U.S. Appl. 11/036,610.

Non-Final Office Action mailed Jul. 24, 2007 re U.S. Appl. No. 11/036,614.

Non-Final Office Action mailed Aug. 9, 2007 re U.S. Appl. No. 11/036,611.

Non-Final Office Action mailed Nov. 1, 2007 re U.S. Appl. 11/036,610.

Non-Final Office Action mailed Sep. 30, 2008 re U.S. Appl. No. 11/036,611.

Non-Final Office Action mailed May 12, 2009 re U.S. Appl. 11/036,611.

Notice of Allowance mailed Jul. 9, 2008 re App No. 111036,614.

Notice of Allowance mailed Nov. 3, 2008 re U.S. Appl. No. 11/036,610.

"new release WinPLOSION V.2", printed from Internet on Nov. 2, 2004.

Notice of Allowance mailed Mar. 3, 2009 re App No. 11/036,615.

Notice of Allowance mailed Aug. 25, 2008 re App No. 11/036,610.

"Opera Software," printed from Internet on Nov. 4, 2004, http://www.opera.com/features/index.dml, 8 pages.

Pro/, "Tip of the Week: Changing Apps in a Big Way," printed page from Internet on Jan. 4, 2005.

Project Looking Glass Sun Microsystems, Nov. 8, 2004, 9 pages, http://wwws.sun.com/software/looking_glass/.

"Safari, the fastest browser on the Mac—the best browser on any platform.", printed from Internet on Aug. 12, 2009, http://www.apple.com/safari/ , 3 pgs.

Shneiderman, Ben, "Treemaps for space-constrained visualization of hierarchies," Dec. 26, 1998, (updated May 18, 2004), 10 pages, printed from the internet on Nov. 2, 2004, http://www.cs.umd.edu/hcil/treemap-history/.

Shareup, AltSwitchReview, Sep. 2004 (http://www.shareup.com/AtlSwitch-download-21278.html.

TDB-ACC-NO: NA 930219—Disclosure Tile: Left-Shift and Right-Shift Buttons for a Standard Window.

The TaskGallery, http://research.microsoft.com/ui/TaskGallery.

* cited by examiner

SYSTEM AND METHOD FOR CONTROLLING THE OPACITY OF MULTIPLE WINDOWS WHILE BROWSING

FIELD OF THE INVENTION

Aspects of the present invention are directed generally to window arrangements in an operating system. More particularly, aspects of the present invention are directed to a method and system for browsing multiple windows in an operating system where the window in focus is opaque and the windows not in focus are at least partially transparent.

BACKGROUND OF THE INVENTION

As the use of computers in both the workforce and personal life has increased, so has the desire to allow for easier use of them. Many operating systems today utilize a windows based configuration of application programs. Information is displayed on a display screen in what appears to be several sheets of paper.

When multiple windows are open at the same time, switching quickly to the desired window can be difficult. For example, the desired window may be partially or fully occluded by other open windows. Also, the desired window may be minimized or hidden.

Window selection interfaces have been proposed to minimize the necessity to sort through the various open windows. Current versions of the Windows brand operating system by Microsoft Corporation include the Alt-Tab key combination, Task List and Taskbar, which when selected presents a list of open windows in a representation different from the primary window. Similar user interfaces exist in MAC OS X brand operating system by Apple Computing, Inc. of Cupertino, Calif. including Apple-Tab and the Dock in which a list of windows in are provided in a representation different from the primary window. Each of the aforementioned user interfaces restate or reformulate the open windows into a type of list. These interfaces however, do not allow the user to view content of a window without the window being selected.

Recently, Apple Computing, Inc. introduced Exposé in the MAC OS X brand operating system. Exposé provides a user with the ability to display all open windows as thumbnails on the desktop. In operation, when the user types the F9 key, Exposé tiles all the open windows. Namely, Exposé scales the windows down to a size such that all the open windows are displayed in a non-overlapping form. In another aspect, Exposé provides a user with the ability to display view all open windows in a particular application in a non-overlapping manner. Specifically, when the user types the F10 key, Exposé tiles all of the open windows for the current application in a non-overlapping form while fading to a gray all of the open windows associated with other applications.

While Exposé allows the user to view open windows simultaneously, multiple windows are tiled on the screen, which can still lead to some confusion. It would be helpful to provide an interface which allows a user to scan quickly through open windows, one at a time, where the current window being viewed can maintain its size.

SUMMARY OF THE INVENTION

There is therefore a need for a method to allow users to quickly scan through open windows one at a time. According to one aspect of the invention, all but one of the open windows is made transparent. The remaining window, which is in focus, is made opaque and therefore clearly visible. In response, to a command, windows can be navigated through where each input causes a window previously not in focus to be in focus and become opaque, and causes the window in focus at the time of the command to become transparent. Thus, at all times during navigation, a single window is opaque and the other windows are transparent. This can be referred to as x-ray browsing.

According to one aspect, a method for concurrently displaying a plurality of windows on a display screen is provided, the method includes, responsive to a command, making a first window the window in focus on the display screen and changing the relative opacities between a content portion of the first window and a content portion of the second window. The opacity of the content portion of the first window is greater than the opacity of the content portion of the second window.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
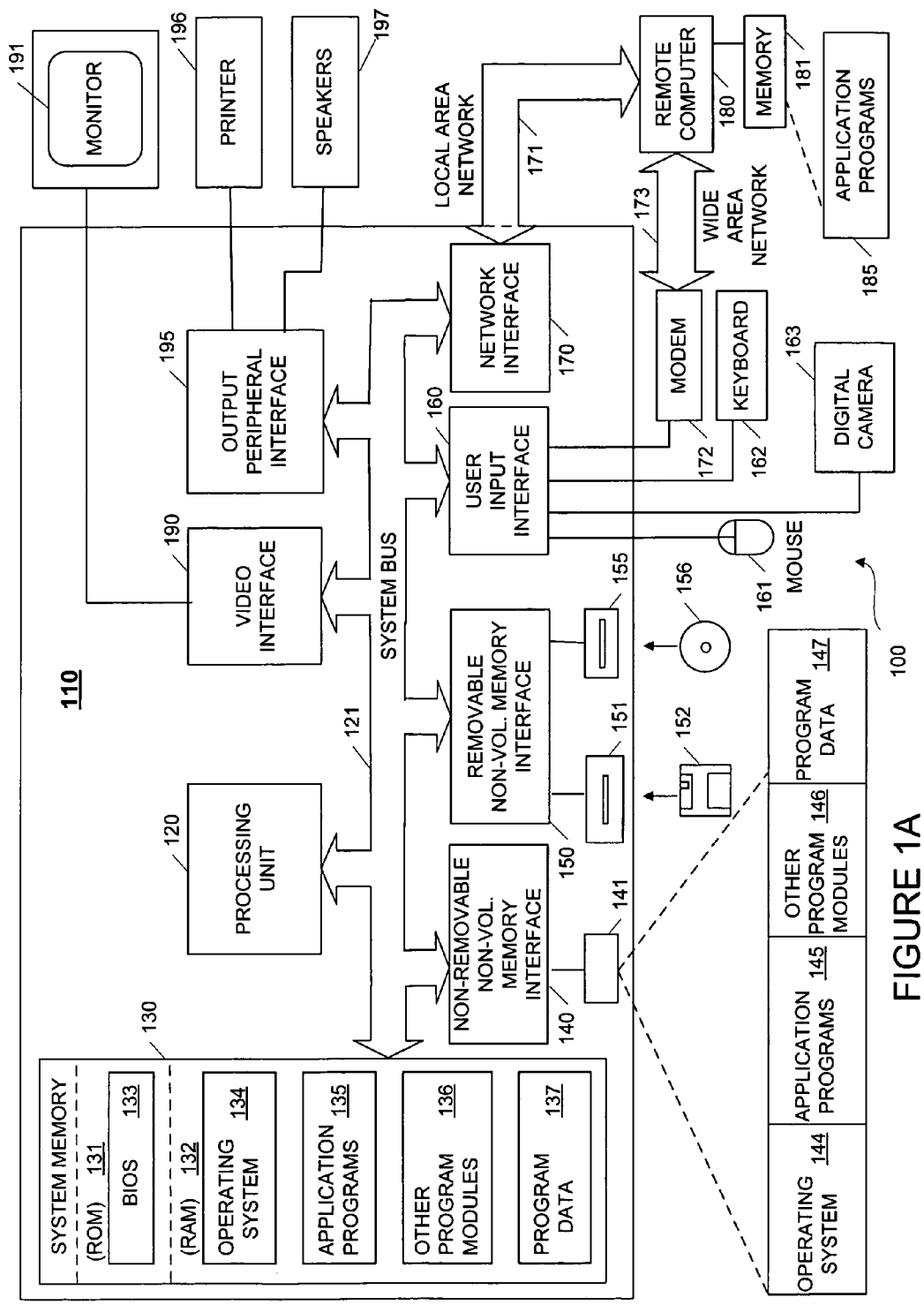
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available med that can be accessed by computer 110 and includes both volatile and nonvolatile media, removable and non-removable media. by way of example, and not limitation, computer readable media may comprise computer storage media and communication media. Computer storage media includes volatile and nonvolatile, removable non-removable media implement in any method or technology for storage of information such as computer readable instruction, data structures, program modules or other data. Computer media includes, but is not limited to, random access memory (RAM), read only memory (ROM), (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures or program modules. By way of example, and not limitation, communication media includes wired media such as a wired network or direct-wired connection, and wireless media such as acoustic, RF, infared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
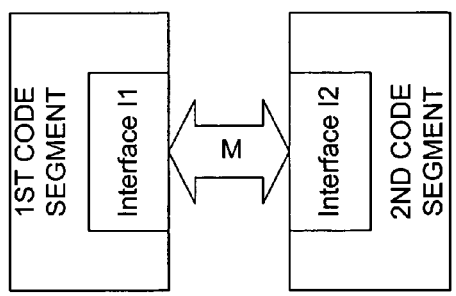
FIGS. 1B through 1M show a general-purpose computer environment supporting one or more aspects of the present invention.
Figure 1E:
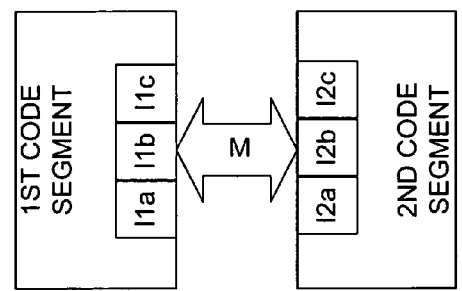
Figure 1B:
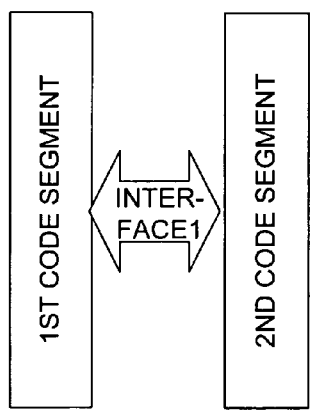

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
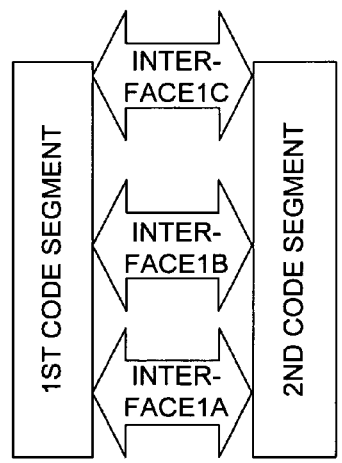

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
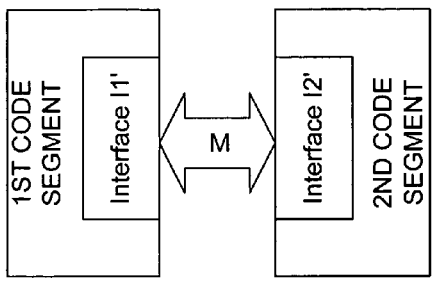
Figure 1G:
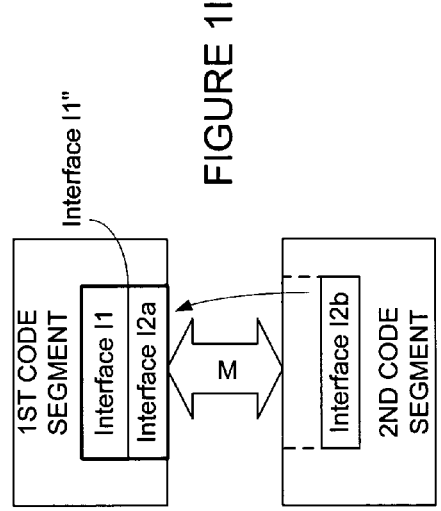

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
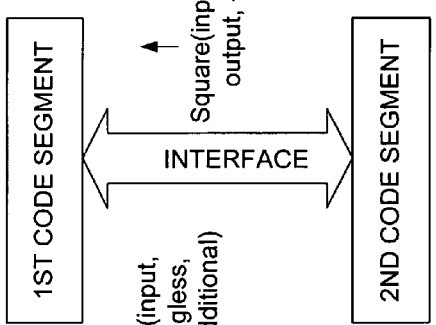
Figure 1I:
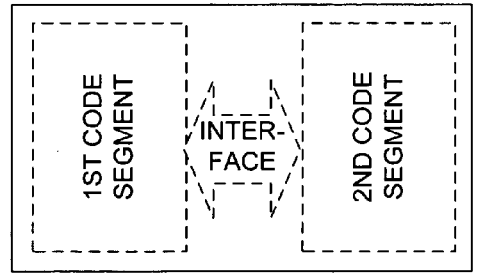

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
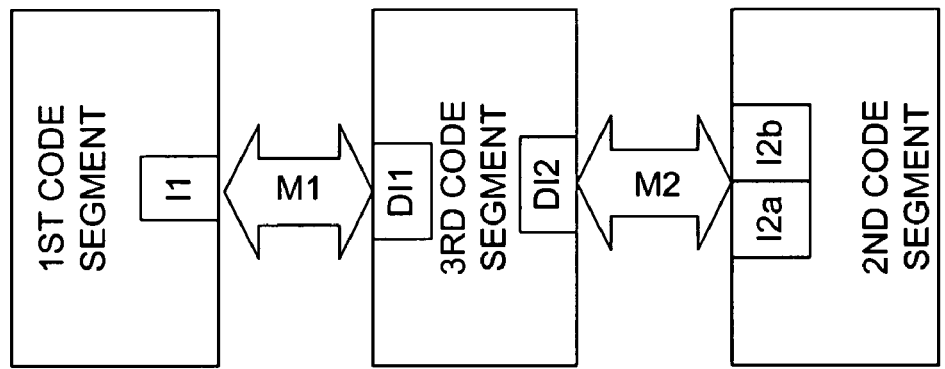
Figure 1J:
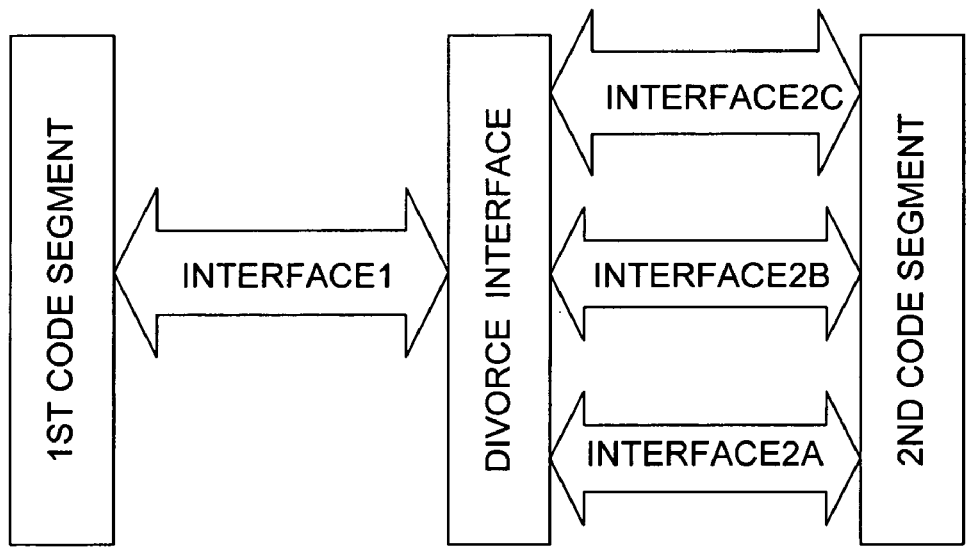

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
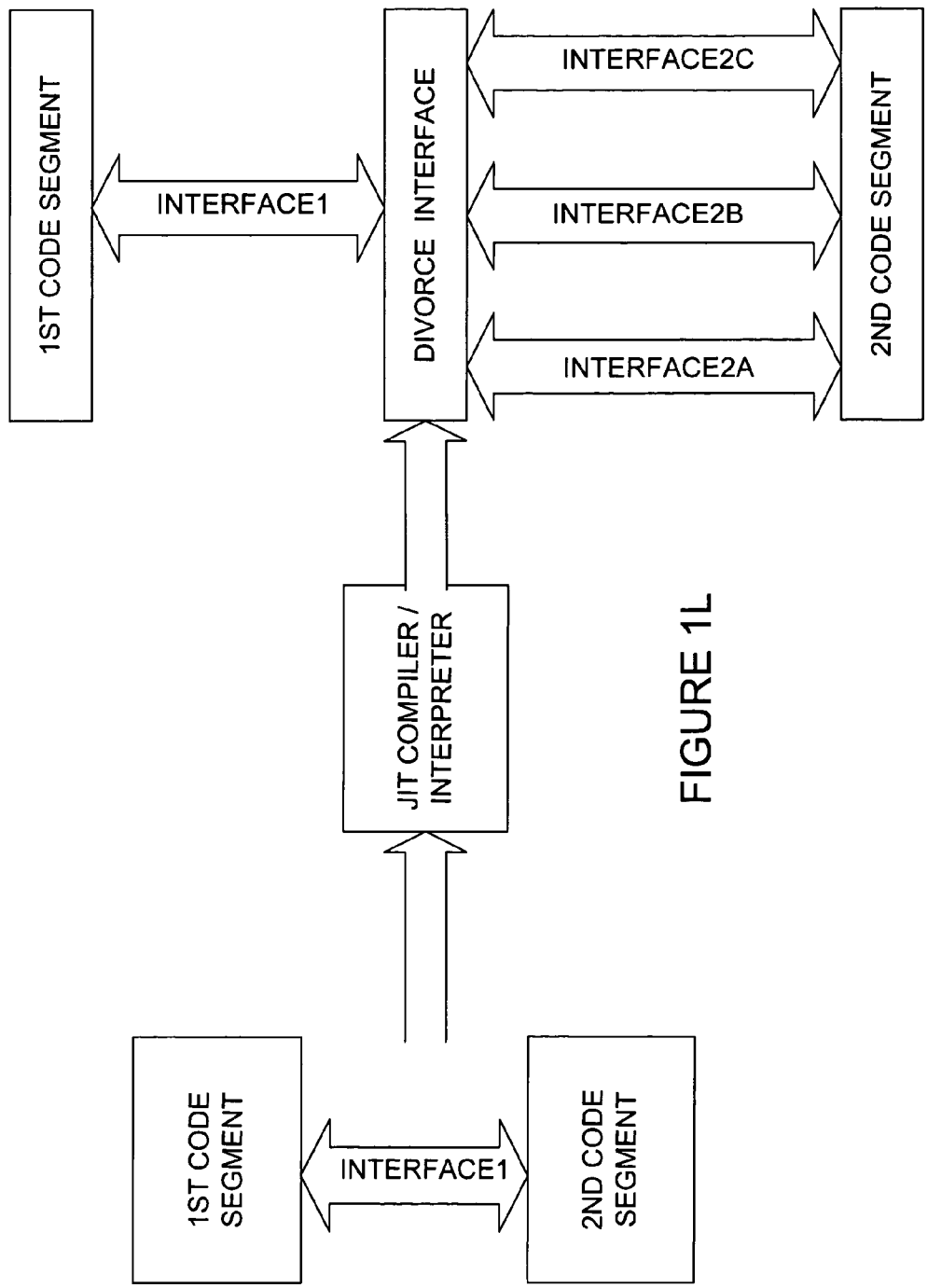
Figure 1M:
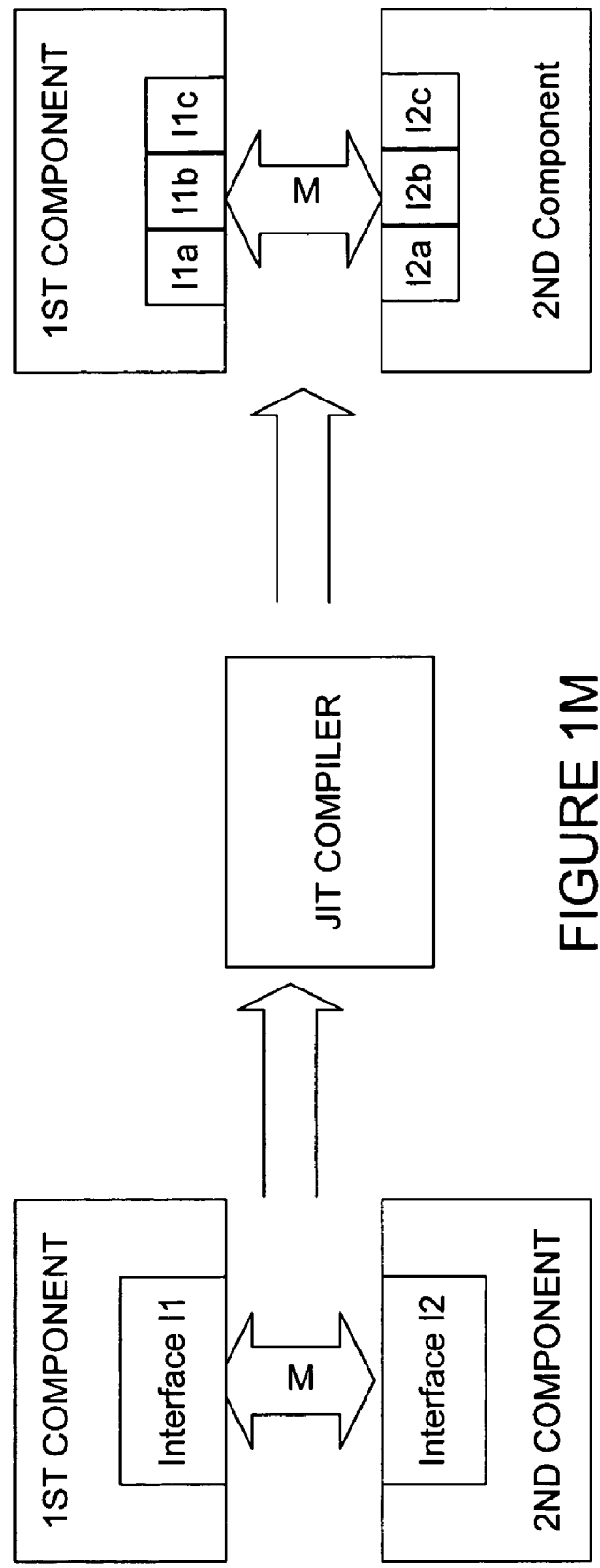

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2A:
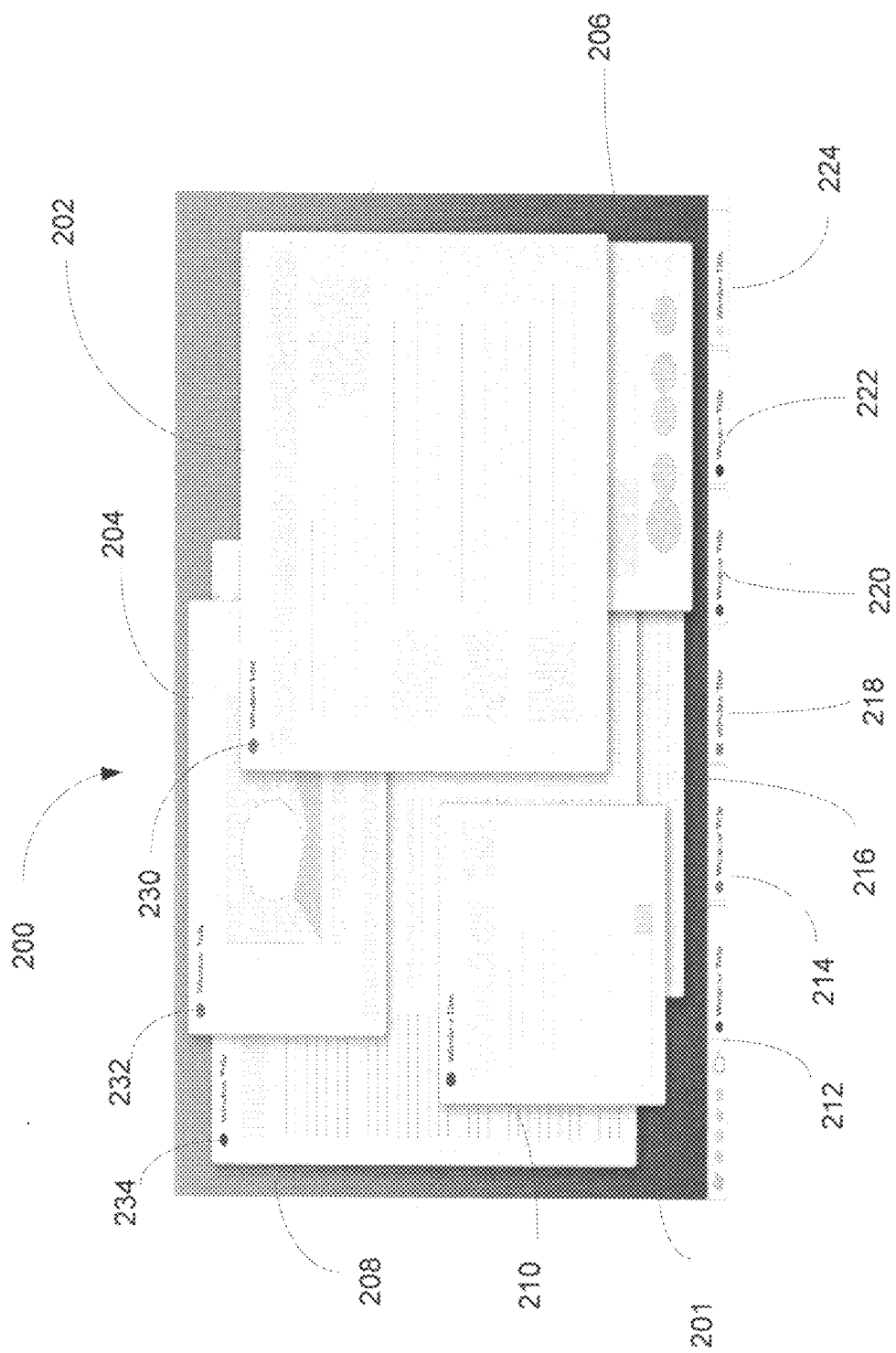
FIGS. 2A-2C illustrate a sequence of display screens to describe x-ray window browsing in accordance with at least one aspect of the present invention.

FIG. 2A illustrates a display screen 200 with multiple open windows overlapping each other. Various windows 202, 204, 206, 208, 210 and 216 are shown in a Z-order orientation. It should be understood by those skilled in the art that the Z-order of an orientation of windows is very well known in the art. Window 202 is shown higher in the Z-order compared to windows 204, 206, 208, 210 and 216. Window 210 is shown higher in the Z-order compared to windows 204, 206, 208 and 216. Window 204 is shown higher in the Z-order compared to windows 206, 208 and 216. Window 206 is shown higher in the Z-order compared to windows 208 and 216, and window 208 is shown higher in the Z-order compared to window 216. Window 216 is shown at the bottom of the Z-order. As used herein, the term "orientation" is defined herein to include adjustments to the visual appearance of a window or group of windows, such as the size or shape of the window and a shared common border between or around at least two windows.

Desktop space 201 is an area of a display that allows for the display of windows corresponding to application programs. The taskbar at the bottom indicates which windows are currently in use, which may be visible or minimized. A taskbar is a specific implementation of an on-screen window remote control used to list and enable manipulation of windows, such as activating, moving, hiding, and minimizing. Window 202 may be represented by taskbar button 212. Window 210 may be represented by taskbar button 214. Window 204 may be represented by taskbar button 218. Window 206 may be represented by taskbar button 220. Window 208 may be represented by taskbar button 222. Window 216 may be represented by taskbar button 224. As shown in this example, all six of the windows are shown open. Although only six windows are shown, it should be understood that more or fewer windows may be open. The taskbar button order may indicate the order in which the corresponding windows were first opened. For example, window 204 is the third window from the top of the Z-order as shown by its corresponding taskbar button 218, while window 216 was the least recent window opened in comparison to the other five windows.

Each of windows 202, 204, 206, 208, 210 and 216 includes an indicium, respectively, corresponding to the application program using the window. Each window in FIG. 2A is shown to include an indicium. For example, windows 202, 204 and 208 respectively include indicium 230, 232, 234. It should be understood by those skilled in the art that any particular window may or may not include a corresponding indicium.

For the windows 202, 204, 206, 208, 210 and 216 shown in FIG. 2A, it is difficult to easily determine the different windows that are open and where any particular window is in the Z-order. In some orientations, one or more windows may completely obscure an underlying window in the Z-order. In such a case, a user will not be able to see the underlying window. Further, in some cases, the taskbar area may be hidden when not in use. As such, a user would not even be able to quickly see the taskbar buttons without activating the taskbar area.

Figure 2B:
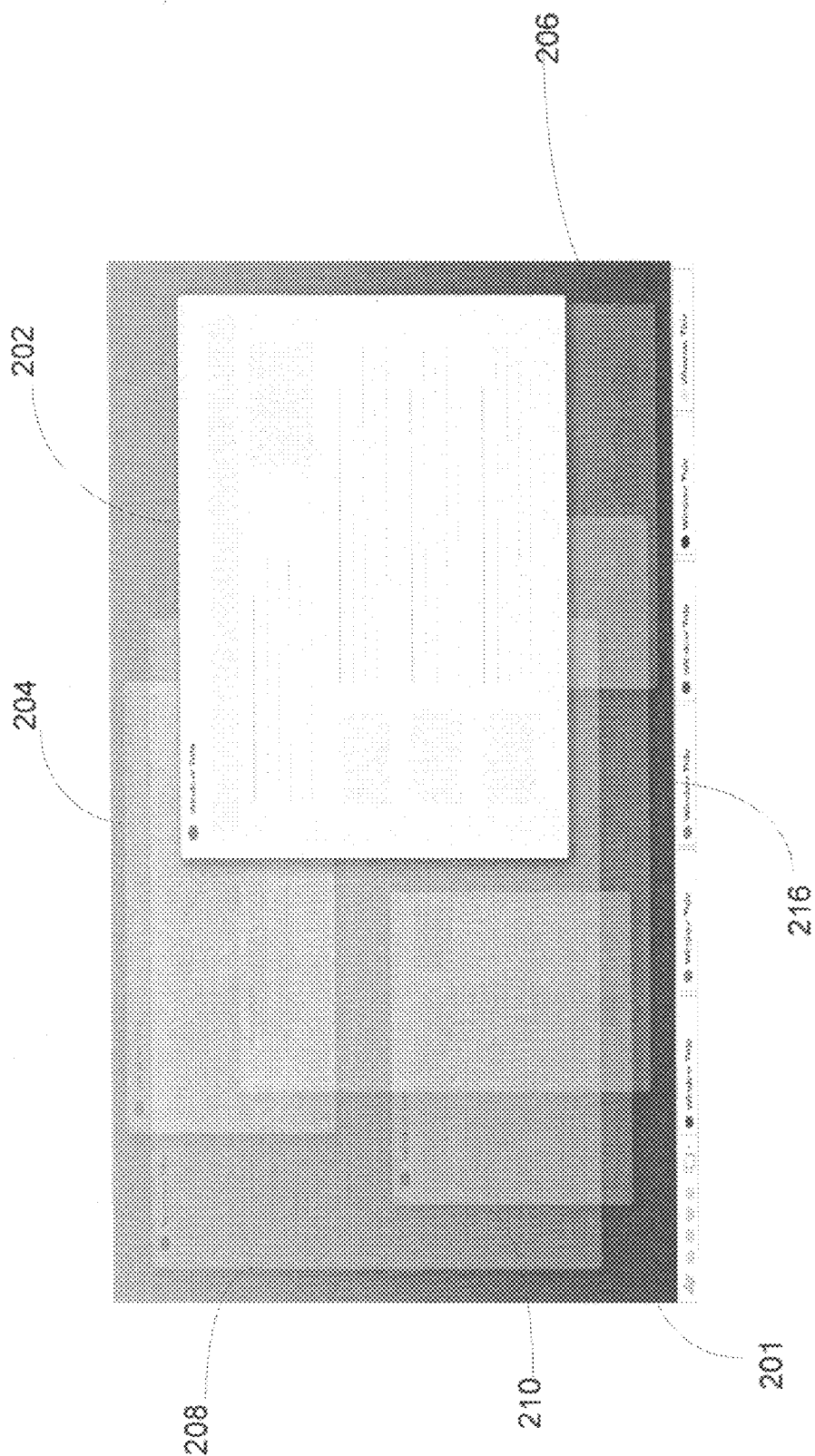

To initiate x-ray window browsing according to an illustrative aspect of the present invention, the user inputs a command in the form of a keyboard shortcut, a mouse action, a voice input or the like. These inputs might include a shortcut sequence like Windows-Tab, or pushing the mouse pointer to a corner of the screen. In response, to the command, each of the windows in FIG. 2A, except one, has their opacities changed to be substantially or wholly transparent. The resulting display screen is shown in FIG. 2B, where each of the windows 204, 206, 208, 210 and 216, except window 202, becomes nearly transparent. The window 202, which is opaque, becomes the window in focus. In the FIG. 2B example, when the x-ray browsing function is initiated, the window 202, which was at the top of the Z-order, becomes in focus and remains opaque. It will be understood that responsive to the command to initiate browsing, the window at the top of the Z-order does not necessarily take focus. Other mechanisms can be used to decide which window should initially take focus. For example, the "default" selection could instead be the second topmost, the rearmost, or the window in which the cursor or mouse pointer is located when the x-ray browsing command is received. Alternatively, a user by way of a dialog menu or other user interface could define this functionality to control which window should be in focus first and the actual order of navigation.

Figure 2C:
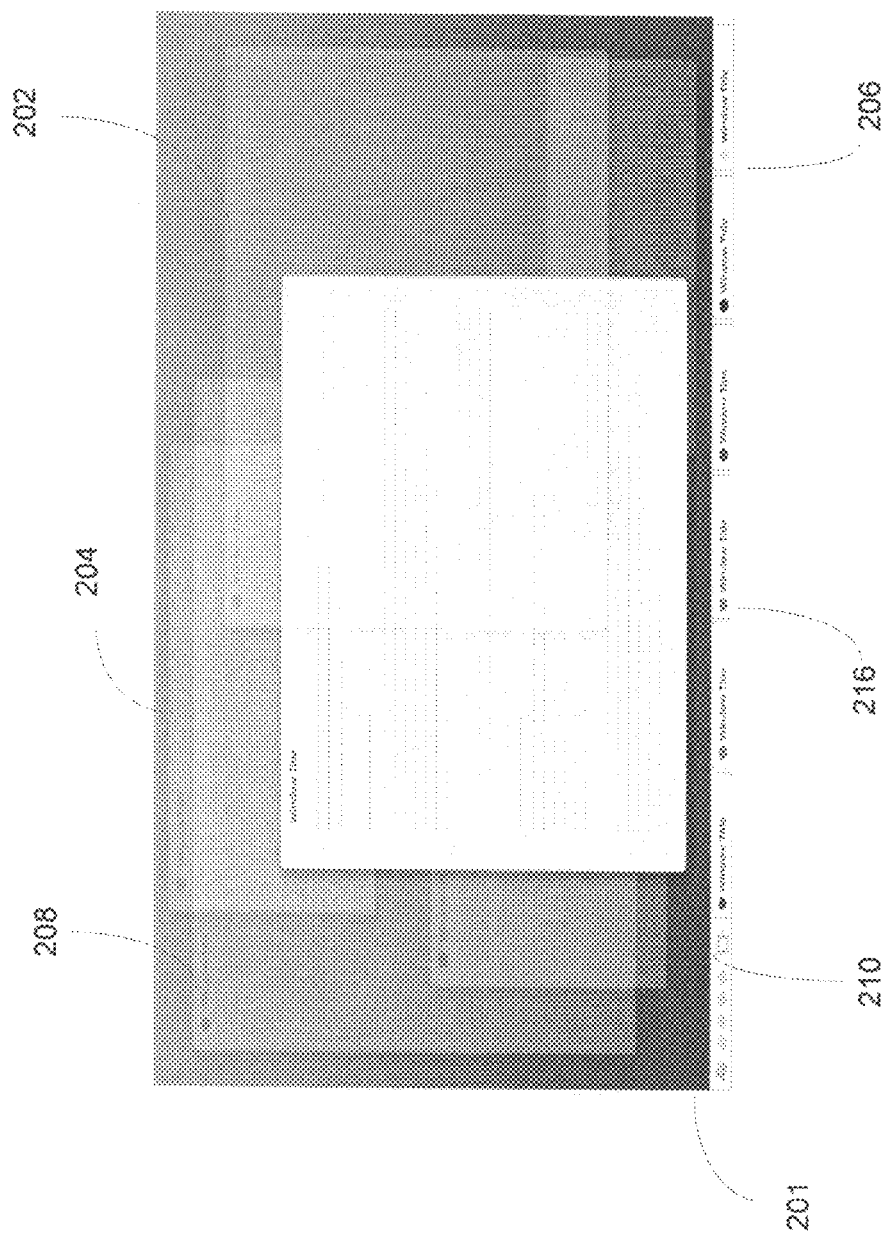

To browse to another of the windows (currently transparent), the user can issue another command by performing an action, such as pressing the Tab key while continuing to hold the Windows key, spinning the mouse wheel one click or providing another input. In this example shown in FIG. 2C, issuance of the command causes the bottommost window 216 in the Z-order to become opaque and in focus, while the other windows including window 202 are set to be substantially transparent. It will be appreciated that browsing to another window may be implemented in response to a further user input or it may occur automatically following a passage of time (e.g., five seconds), for example in much the same way a scan operation functions with respect to a radio. In both instances, a browsing command is initiated, one by a user and the other automatically.

In the illustrative implementation shown, only one window is ever fully opaque, and the user navigates through the open windows in a linear order. One illustrative order is Z-order (closest to farthest). However, many other orders are possible, like distance from an edge or corner of the screen, alphabetical by title of the window, alphabetical by application and title, etc. A user interface may be provided in a configuration mode to allow the user to pre select the order in which windows would be navigated.

Continued browsing will cause other individual windows to be put in focus and have their opacities increased to be substantially opaque successively while the opacity of the remaining windows, not in focus, will be to be substantially transparent. In this implementation, at any one time, the window in focus has a substantially greater opacity than the windows not in focus. Upon completion of browsing, for example in response to a command, the Z-order can change where the window in focus moves to the top of the Z-order and the opacity of all the windows returns to the opacity shown in FIG. 2A.

In certain illustrative implementations of browsing according to the present invention, all open windows maintain their horizontal and vertical position and size, as well as their position in the Z-order while being browsed. While not required, maintaining these parameters as described can minimize the impact of the browsing action on the user's mental model of their workspace. As such, the user will more easily be able to remember the window size, window position, and the period in which a specific window was browsed relative to other windows to find the desired window more quickly.

While the example of the invention described with respect to FIGS. 2A-2C discloses a system which uses all the open and visible windows, one skilled in the art will appreciate that minimized or hidden windows could also be represented by thumbnails or full-sized (restored) versions in the desktop space 201 and thus could be browsed to by applying the x-ray browsing method described. That is, in response to a command, all minimized and hidden windows could be included on the display screen as thumbnails or in restored versions.

Alternatively, a subset of the open (visible or hidden) windows could be browsed through. In one implementation, browsing could be set to occur based on all windows associated with a word processing application, or all windows with other common characteristics. In these scenarios, the windows on the desktop could be segmented into a particular group and the browsing would only be carried out among those windows in the particular group. The screen real estate could be used entirely for the browsing action or could be subdivided as needed.

Figure 3:
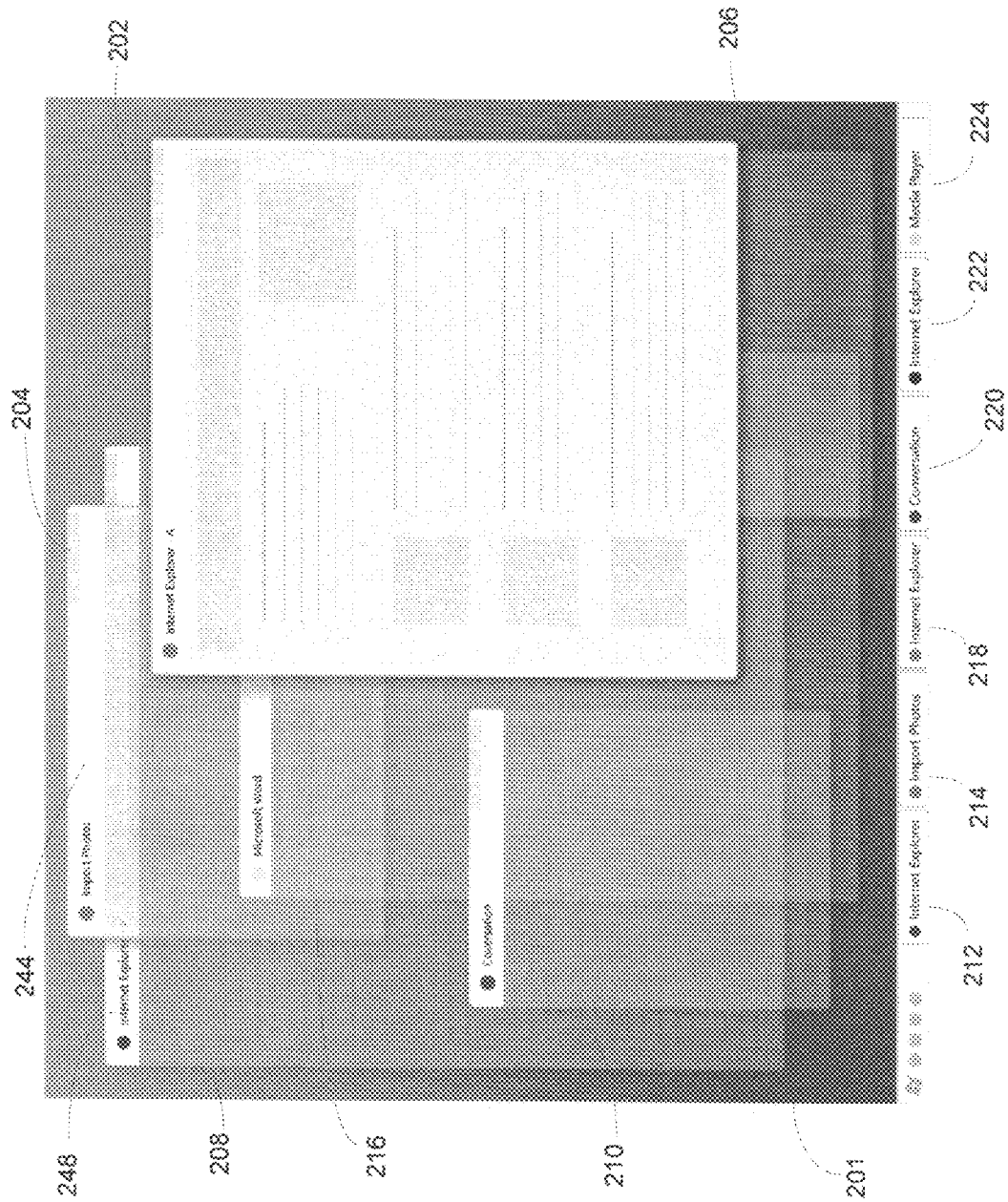
FIG. 3 illustrates a display screen showing x-ray browsing in accordance with another aspect of the present invention.

In a further implementation of x-ray browsing as shown in FIG. 3, the titlebar of the windows out of focus may remain opaque to allow the user to easily identify other windows, which can be navigated to. For example, the titlebars 244 and 248 of windows 204 and 208, respectively, are shown as being opaque in FIG. 3. In this implementation, the content portion of the windows not in focus would still have their opacities reduced relative to the opacities of the content portion of the window in focus. Also, the opacity of the title portion of the window in focus could also be set to be substantially transparent to allow a user to see more of the underlying windows. One skilled in the art will appreciate that the opacities of the windows or portions of windows may be manipulated as appropriate to aid a user in browsing through open windows. While the present invention does not require any specific window opacity to achieve the benefits of x-ray browsing, the opacity of the window in focus needs to be of a nature which delineates it from the windows out of focus. Stated differently, the relative opacity between a window in focus and a window out of focus should be sufficient to allow a user to visually differentiate with relative ease which window is in focus and which is not.

Figure 4:
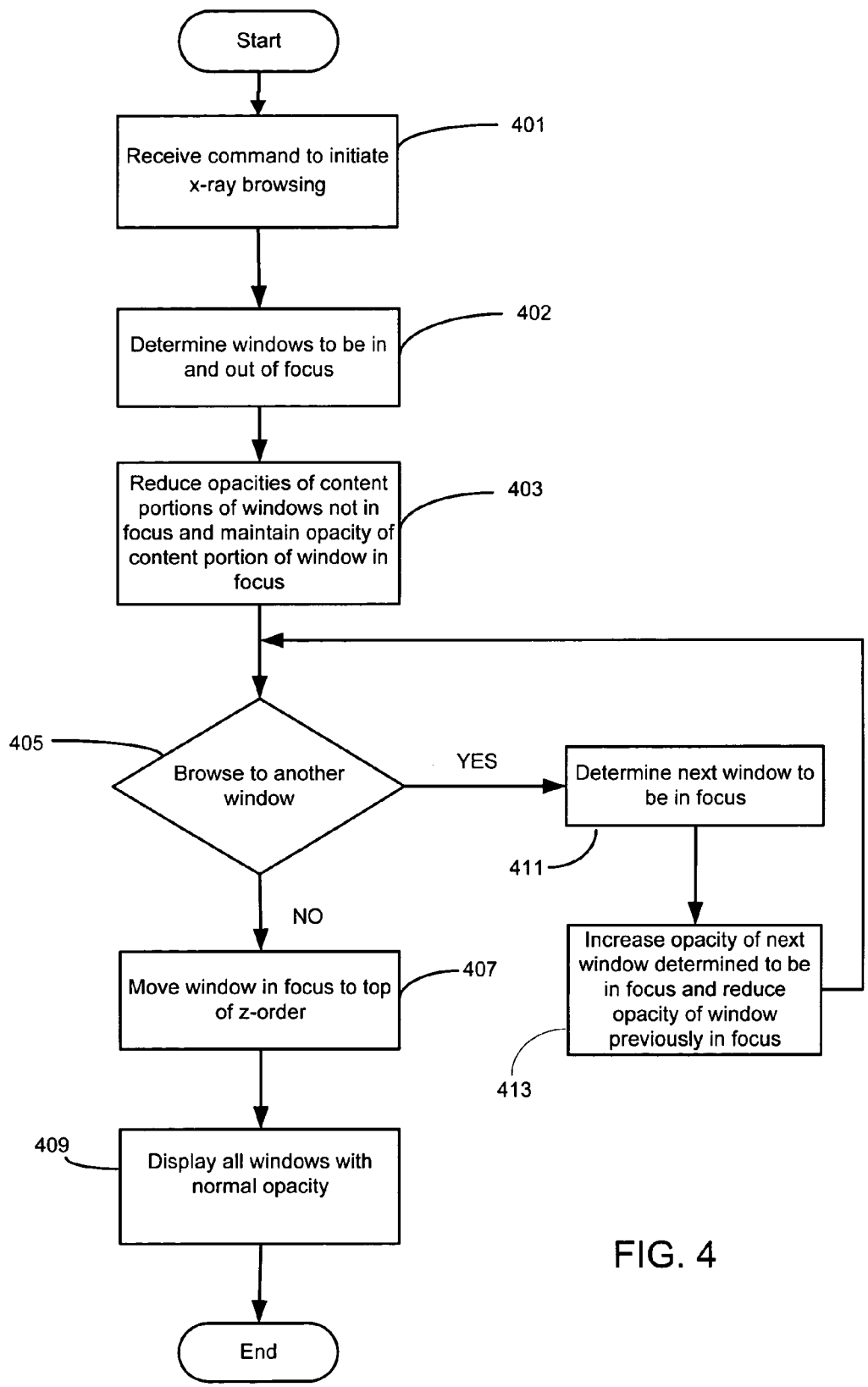
FIG. 4 is a flowchart of an illustrative example of a method for performing x-ray browsing in accordance with at least one aspect of the present invention.

FIG. 4 shows a flow diagram according to at least one illustrative aspect of the present invention. With windows open on the display screen, x-ray browsing is initiated by a user inputting a command in step 401. In response, the operating system determines which window is in focus and the windows out of focus in step 402. Then, in step 403, the opacities of at least the content portions of the windows determined to be not in focus are reduced while the opacity of at least the content portion of the window determined to be in focus is maintained. In step 405, it is determined whether another window will be browsed to. If not, x-ray window browsing is exited, and in step 407 the window in focus moves to the top of z-order and in step 409 the open windows return to their opacity prior to the initiation of x-ray browsing. If browsing to another window is called for, then in step 411, it is determined, which of the windows not in focus will be the next window in focus. Then, in step 413, the opacity of the next window determined to be in focus will be increased and the opacity of the window previously in focus will be reduced. Thereafter, control returns to step 405.

It will be appreciated by one skilled in the art that aspects of the invention described above may be applied to any view of a collection of objects which are typically identified by their visual attributes (i.e. size, shape, position, content). For example, a collection of photographs in a folder (container) may be presented as piles (or stacks), grouped by a common attribute or explicitly by the user. Because these stacks also maintain a z-order, aspects of the invention could be used to 'browse' the stack of photos to locate/retrieve a specific photo without having to resort to opening, or flattening, the stack.

Most existing operating systems have functionality to control the opacities of windows and third party software exists that allows users to manually change the opacity of a single window. In another implementation of the present invention, various aspects of the present invention may be performed by an application programming interface (API). For example, public APIs may interface with an operating system to allow an operating system to provide the various features of the present invention. In one aspect, a software architecture for processing data representative of a first window in focus and a second window out of focus on a computer display may include a component configured to set the opacity of a first window and a second window, wherein the opacity of the first window is set to be substantially opaque relative to the opacity of the second window and an application program interface to access the component. An API may receive a request to put one window in focus and other windows out of focus, access the necessary function(s) to perform the operation, and then send the results back to an operating system. The operating system may use the data provided from the API to perform the various features of the present invention.

In another implementation, a programming interface operable with an operating system, can perform the steps including intercepting an instruction to a destination module from the operating system to place one window in focus and other windows out of focus and providing to the destination module an instruction to set the opacity of the one window and the other windows, wherein the instruction sets the opacity of the one window to be substantially opaque relative to the opacities of the other windows.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A computer storage media having instructions embodied thereon that, when executed, perform a method for concurrently displaying a plurality of windows on a display screen, the method comprising in order the steps of:

responsive to a single first command, reducing the opacity of a first window and a third window to a first level and setting the opacity of a second window at a second level, wherein the second level is more opaque than the first level and wherein the reducing of the opacity of the first window and the third window, and setting the opacity of the second window occurs substantially simultaneously upon the reception of the single first command; and responsive to a single second command, increasing the opacity of the first window to the second level and reducing the opacity of the second window to the first level and maintaining the opacity of the third window at the first level;

responsive to a third command after the second command, moving the first window to the top of the z-order, maintaining the third window below the second window in the z-order, and changing the opacity of the second window and the third window to be the same as the first window.

2. The computer storage media of claim 1, further comprising:

responsive to the first command, reducing the opacity of a third window level to the first level; and responsive to the second command, maintaining the opacity of the third window.

3. The computer storage media of claim 1, wherein the second level of opacity is substantially opaque and the first level of opacity is substantially transparent.

4. The computer storage media of claim 1, wherein in response to the first and second commands, the first and second windows maintain their position in the z-order.

5. The computer storage media of claim 1, wherein prior to receiving the first command, the second window is at the top of the z-order.

6. A computer storage media having computer-executable instructions embodied thereon that, when executed, perform a method for concurrently displaying in a z-order configuration a plurality of windows, the method comprising:

responsive to a single first command, simultaneously setting the opacity of at least a content portion of all windows, except for a first window, to be substantially transparent, and setting the opacity of the content portion of a second window to be less than the opacity of a title portion of the second window;

setting the opacity of at least a content portion of the first window to be substantially opaque; wherein the opacity of the title portion of the second window is the same as the opacity of the content portion of the first window: wherein the opacity of the title portion of the first window is the same as the opacity of the title portion of the second window;

responsive to a single second command, changing the opacity of at least the content portion of a second window from being substantially transparent to being substantially opaque and changing the opacity of at least the content portion of the first window from being substantially opaque to being substantially transparent and maintaining the opacity of the remaining windows; and responsive to a single third command, changing the opacity of all windows to an original opacity level and moving the second window to the top of the z-order.

7. The computer storage media of claim 6, wherein the first and second windows are from a common group.

8. The computer storage media of claim 7, wherein the group is defined by open windows associated with the same application.

9. The computer storage media of claim 6, wherein the step of changing in response to the second command and the step of changing in response to the third command includes determining which window to put in focus.

10. The computer storage media of claim 6, further including restoring a minimized or hidden window responsive to the first command.

11. The computer storage media of claim 6, wherein the single first command is selected from the group comprising: a keyboard key stroke, movement of a pointer to a predetermined location on a display screen, and a mouse action.

12. One or more computer storage media having computer-executable instructions embodied thereon that, when executed, perform a method for concurrently displaying a plurality of windows on a display screen to allow browsing of the windows, the method comprising in order the steps of:

displaying the plurality of windows with an original opacity level, wherein the original opacity level is at least substantially opaque and wherein the windows are arranged in a z-order;

responsive to a single first command, reducing the opacity level of all windows, except for a first window at the top of the z-order, to a first opacity level and setting the opacity level of the first window to a second opacity level, wherein the first opacity level is substantially transparent and the second opacity level is substantially opaque, and wherein the reducing and setting occur substantially simultaneously;

responsive to a single second command, increasing the opacity of a second window to the second opacity level, decreasing the opacity of the first window to the first opacity level and maintaining the opacity of all other windows at the first opacity level;

responsive to a single third command, returning the opacity of all windows to the original opacity level and moving the second window to the top of the z-order; wherein the second opacity level is equal to the original opacity level.

* * * * *